United States Patent
Chittigala et al.

(10) Patent No.: US 9,928,056 B1
(45) Date of Patent: Mar. 27, 2018

(54) OPERATING SYSTEM UPDATE MANAGEMENT

(71) Applicant: International Business Machines Corporation, Armonk, NY (US)

(72) Inventors: Jes K. Chittigala, Hyderabad (IN); Ravikiran Moningi, Hyderabad (IN); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/289,810

(22) Filed: Oct. 10, 2016

(51) Int. Cl.
*G06F 9/44* (2006.01)
*G06F 9/445* (2006.01)
*G06F 9/50* (2006.01)

(52) U.S. Cl.
CPC .............. *G06F 8/65* (2013.01); *G06F 9/5077* (2013.01); *G06F 8/30* (2013.01); *G06F 8/61* (2013.01); *G06F 8/68* (2013.01)

(58) Field of Classification Search
CPC ..... G06F 8/60; G06F 8/61; G06F 8/65; G06F 8/67; G06F 8/68; G06F 8/71
See application file for complete search history.

(56) References Cited

U.S. PATENT DOCUMENTS

| | | | |
|---|---|---|---|
| 7,197,516 B1 | 3/2007 | Hipp et al. | |
| 2007/0136721 A1 | 6/2007 | Dunshea et al. | |
| 2013/0047160 A1* | 2/2013 | Conover | G06F 8/65 718/1 |
| 2013/0283297 A1 | 10/2013 | Filali-Adib et al. | |
| 2013/0311982 A1* | 11/2013 | Lal | G06F 8/65 717/172 |
| 2015/0169329 A1* | 6/2015 | Barrat | G06F 8/67 713/2 |
| 2015/0212866 A1* | 7/2015 | Lee | G06F 8/65 713/2 |
| 2015/0212886 A1* | 7/2015 | Coteus | G06F 11/0772 714/766 |
| 2015/0347120 A1* | 12/2015 | Garg | H04L 41/5038 709/223 |

(Continued)

OTHER PUBLICATIONS

Giuffrida et al., "Safe and Automatic Live Update for Operating Systems", ACM, ASPLOS'13, Mar. 2013, pp. 279-291; <http://dl.acm.org/citation.cfm?id=2451147&CFID=809256710&CFTOKEN=60555220>.*

(Continued)

*Primary Examiner* — Thuy Dao
*Assistant Examiner* — Ben C Wang
(74) *Attorney, Agent, or Firm* — Jared C. Chaney

(57) ABSTRACT

Operating system update management for a shared pool of configurable computing resources having a plurality of logical partitions (LPARs). An operating system update request may be received. A set of original shared portions and a set of original individualized portions may be classified with respect to a set of original files on a set of original nodes. A set of original overlay links may be created for the set of original files. A set of operating system network traffic may be routed using the set of original overlay links. A set of successor files may be established on a set of surrogate nodes. A set of successor overlay links may be created for the set of successor files. The set of operating system network traffic may be routed using the set of successor overlay links in place of the set of original overlay links.

20 Claims, 8 Drawing Sheets

(56) References Cited

U.S. PATENT DOCUMENTS

| | | | |
|---|---|---|---|
| 2016/0026473 A1* | 1/2016 | Bower, III | G06F 9/4401 713/2 |
| 2016/0082194 A1* | 3/2016 | Furukawa | A61M 5/3129 604/222 |
| 2016/0082203 A1* | 3/2016 | McCullough | A24B 13/00 392/390 |
| 2016/0092194 A1* | 3/2016 | Chhatwal | G06F 8/65 717/170 |
| 2016/0092202 A1 | 3/2016 | Filali-Adib et al. | |
| 2016/0092203 A1* | 3/2016 | Filali-Adib | G06F 8/67 717/171 |
| 2016/0092207 A1* | 3/2016 | Chhatwal | H04L 41/082 717/121 |
| 2016/0092343 A1* | 3/2016 | Chhatwal | G06F 11/3664 717/124 |
| 2017/0039060 A1* | 2/2017 | Brusky | G06F 8/65 |
| 2017/0090906 A1* | 3/2017 | Reynolds | G06F 8/65 |
| 2017/0147320 A1* | 5/2017 | Persson | G06F 8/65 |
| 2017/0230237 A1* | 8/2017 | Maruyama | H04L 41/082 |
| 2017/0235951 A1* | 8/2017 | Harrison | G06F 21/561 726/24 |
| 2017/0262308 A1* | 9/2017 | Conover | G06F 9/45558 |

OTHER PUBLICATIONS

Makris et al., "On-the-fly kernel updates for high-performance computing clusters", IEEE, Apr. 2006, pp. 1-8; <http://ieeexplore.ieee.org/document/1639690/>.*

Chen et al., "Adaptive Android Kernel Live Patching", 26th USENIX Security Symposium, Aug. 2017, USENIX, pp. 1253-1270; <https://www.usenix.org/system/files/conference/usenixsecurity17/sec17-chen.pdf>.*

Brasser et al., "Swap and Play: Live Updating Hypervisors and Its Application to Xen", Nov. 2014, CCSW'14, ACM, pp. 33-44; <https://dl.acm.org/citation.cfm?id=2664173&CFID=999654335&CFTOKEN=49532319>.*

Terada et al., "Dwarf: Shortening Downtime of Reboot-based Kernel Updates", Dec. 2016, IEEE, pp. 208-217; <http://ieeexplore.ieee.org/stamp/stamp.jsp?tp=&arnumber=7780362>.*

Mell, Peter, et al., The NIST Definition of Cloud Computing, National Institute of Standards and Technology, Oct. 7, 2009, Version 15, NIST, Gaithersburg, MD, US.

International Business Machines Corporation; "AIX Live Update"; <https://www.ibm.com/developerworks/community/blogs/cgaix/resource/AIXLiveUpdateblog.pdf?lang=en>: Oct. 5, 2015.

* cited by examiner

OPERATING SYSTEM UPDATE MANAGEMENT

BACKGROUND

This disclosure relates generally to computer systems and, more particularly, relates to operating system update management for a shared pool of configurable computing resources having a plurality of logical partitions (LPARs). The amount of data that needs to be managed by enterprises is increasing. System updates and data sharing for network nodes may be desired to be performed as efficiently as possible. As data needing to be managed increases, the need for efficient system update and data sharing infrastructure may increase.

SUMMARY

Aspects of the disclosure relate to operating system update management for a shared pool of configurable computing resources having a plurality of logical partitions (LPARs). A live kernel update operation may be used to update multiple logical partitions of a set of computing resources. The updated files may be shared across the logical partitions after block level modification to save disk space. A shared link may be used to establish individualized and shared regions for a set of files of multiple LPARS. Modifications made to the individualized portion of a file may be applied to that specific file, while modifications made to the shared portion may be synchronized and reflected in one or more other files that are part of the shared link. Surrogate LPARs may be created on an updated base operating system image using a set of overlay links to route operating system network traffic.

Disclosed aspects relate to operating system update management for a shared pool of configurable computing resources having a plurality of logical partitions. An operating system update request may be received. A set of original shared portions and a set of original individualized portions may be classified with respect to a set of original files on a set of original nodes. A set of original overlay links may be created for the set of original files. A set of operating system network traffic may be routed using the set of original overlay links. A set of successor files may be established on a set of surrogate nodes. A set of successor overlay links may be created for the set of successor files. The set of operating system network traffic may be routed using the set of successor overlay links in place of the set of original overlay links.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
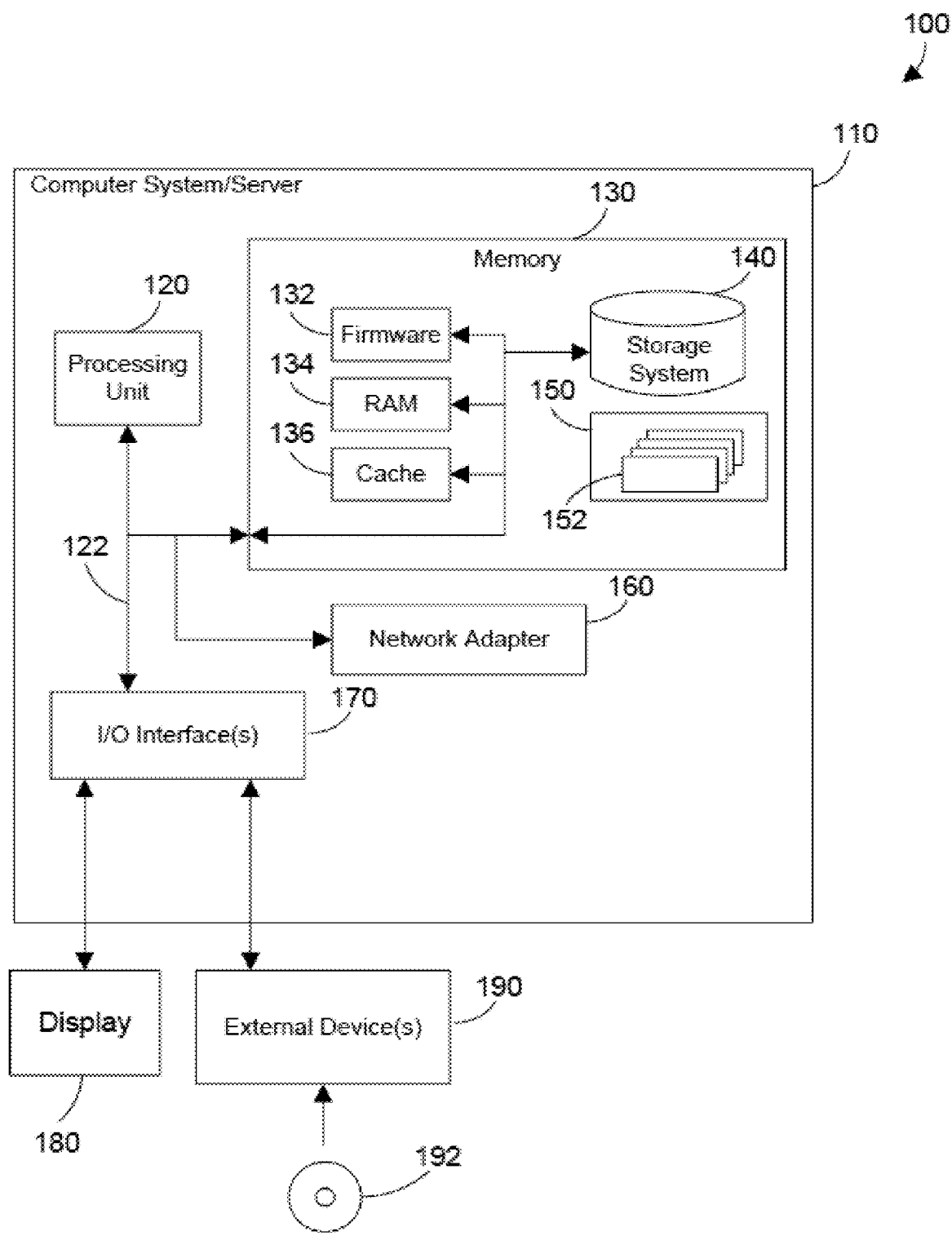
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to operating system update management for a shared pool of configurable computing resources having a plurality of logical partitions (LPARs). A live kernel update operation may be used to update multiple logical partitions of a set of computing resources. The updated files may be shared across the logical partitions after block level modification to save disk space. A shared link may be used to establish individualized (e.g., private) and shared regions for a set of files of multiple LPARS. Modifications made to the individualized portion of a file may be applied to that specific file, while modifications made to the shared portion may be synchronized and reflected in one or more other files that are part of the shared link. Surrogate LPARs may be created on an updated base operating system image using a set of overlay links to route operating system network traffic. Leveraging private and shared regions for operating system update management may be associated with benefits including efficient disk space usage, streamlined data sharing/transfer, and operating system reliability.

System downtime and system resource utilization represent possible challenges related to managing operating system updates. Installing operating system updates to logical partitions can often result in system downtime (e.g., install time, machine restarts) as well as increased disk usage as the size of operating systems increase (e.g., due to additional service packs, patches, added technology levels). Accordingly, aspects of the disclosure relate to formatting logical partitions to have private and shared storage regions, such that data that is common to multiple logical partitions (e.g., base operating system images) can be shared between a plurality of logical partitions, while granular calibrations for each node may still be retained in private storage regions for each node. System operations for logical partitions may be transitioned from original nodes to surrogate nodes upon update completion to avoid system restarts and reduce system downtime. In this way, the amount of storage space needed for operating system storage may be decreased (e.g., as multiple nodes share a single base operating system image on a shared physical memory space), and time-efficient operating system updates may be facilitated.

Aspects of the disclosure include a method, system, and computer program product for a shared pool of configurable computing resources having a plurality of logical partitions (LPARS). Aspects of the disclosure relate to initiating performance of a live kernel update (LKU) operation with respect to a set of original files on an original set of original nodes which have a set of original overlay links. An operating system update request for the shared pool of configurable computing resources may be received. A set of original shared portions and a set of original individualized portions may be classified with respect to a set of original files on a set of original nodes. A respective original file of the set of original files may have a respective original shared portion and a respective original individualized portion. In embodiments, the set of original shared portions may include a set of original base operating system images. In embodiments, the set of original individualized portions may include a set of original technology levels and a set of original service packs. Aspects of the disclosure relate to creating a set of original overlay links for the set of original files on the set of original nodes including a respective original overlay link for the respective original file of the set of original files. Using the set of original overlay links, a set of operating system network traffic may be routed.

Aspects of the disclosure relate to establishing a set of successor files on a set of surrogate nodes to succeed the set of original files on the set of original nodes. A first respective successor file of the set of successor files may map to a single successor shared storage segment and a first respective successor individualized storage segment. A second respective successor file of the set of successor files may map to the single successor shared storage segment and a second respective successor individualized storage segment. In embodiments, the single successor shared storage segment may include a single successor base operating system image which is common for the plurality of LPARs. In embodiments, the first respective successor individualized storage segment may include a first successor technology level, and the second respective successor individualized storage segment may include a second successor technology level which differs from the first successor technology level. In embodiments, the first respective successor individualized storage segment may include a first successor service pack, and the second respective successor individualized storage segment may include a second successor service pack which differs from the first successor service pack.

Aspects of the disclosure relate to creating a set of successor overlay links for the set of successor files on the set of surrogate nodes. The set of successor overlay links may include a shared overlay link which maps to the single successor shared storage segment, a first respective overlay link which maps to the first respective successor individualized storage segment, and a second respective overlay link which maps to the second respective successor individualized storage segment. In embodiments, performing the live kernel update operation may include invalidating the set of original overlay links, validating the set of successor overlay links, and freeing a chunk of storage corresponding to the set of original files. The set of successor overlay links may be used to route the set of operating system network traffic in place of the set of original overlay links.

In embodiments, an original overlay link usage count may be incremented for each original overlay link of the set of original overlay links. In embodiments, the original overlay link usage count may be decremented for each original overlay link of the set of original overlay links switched to the set of successor overlay links. In embodiments, in response to a live kernel update operation, it may be detected that the original overlay link usage count has shrunk to zero. In response to detecting that the original overlay link usage count has shrunk to zero, the respective original shared portion of the respective original file of the set of original files may be removed. In embodiments, the first respective successor individualized storage segment may be modified without modifying the second respective successor individualized storage segment and without modifying the single successor shared storage segment. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
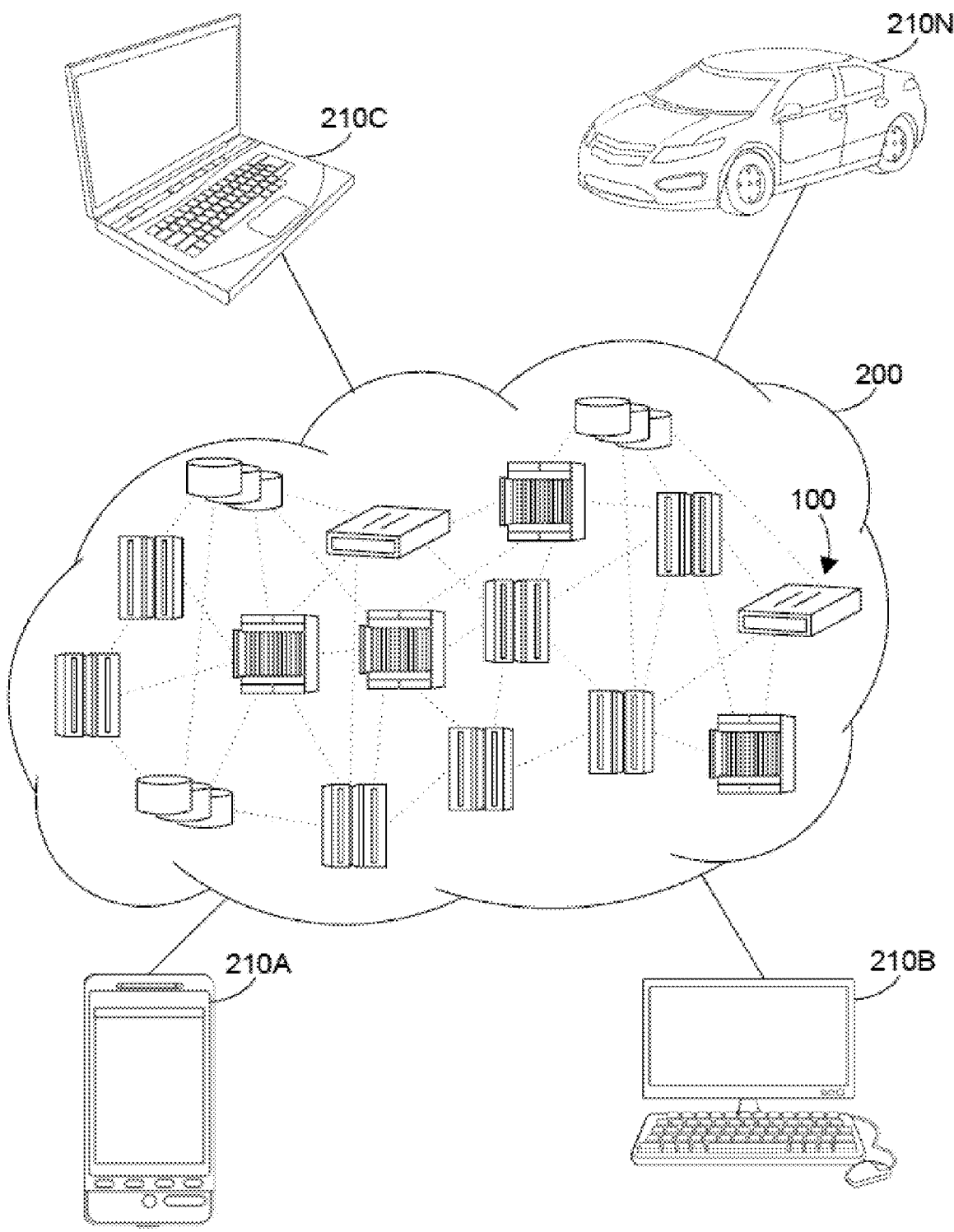
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
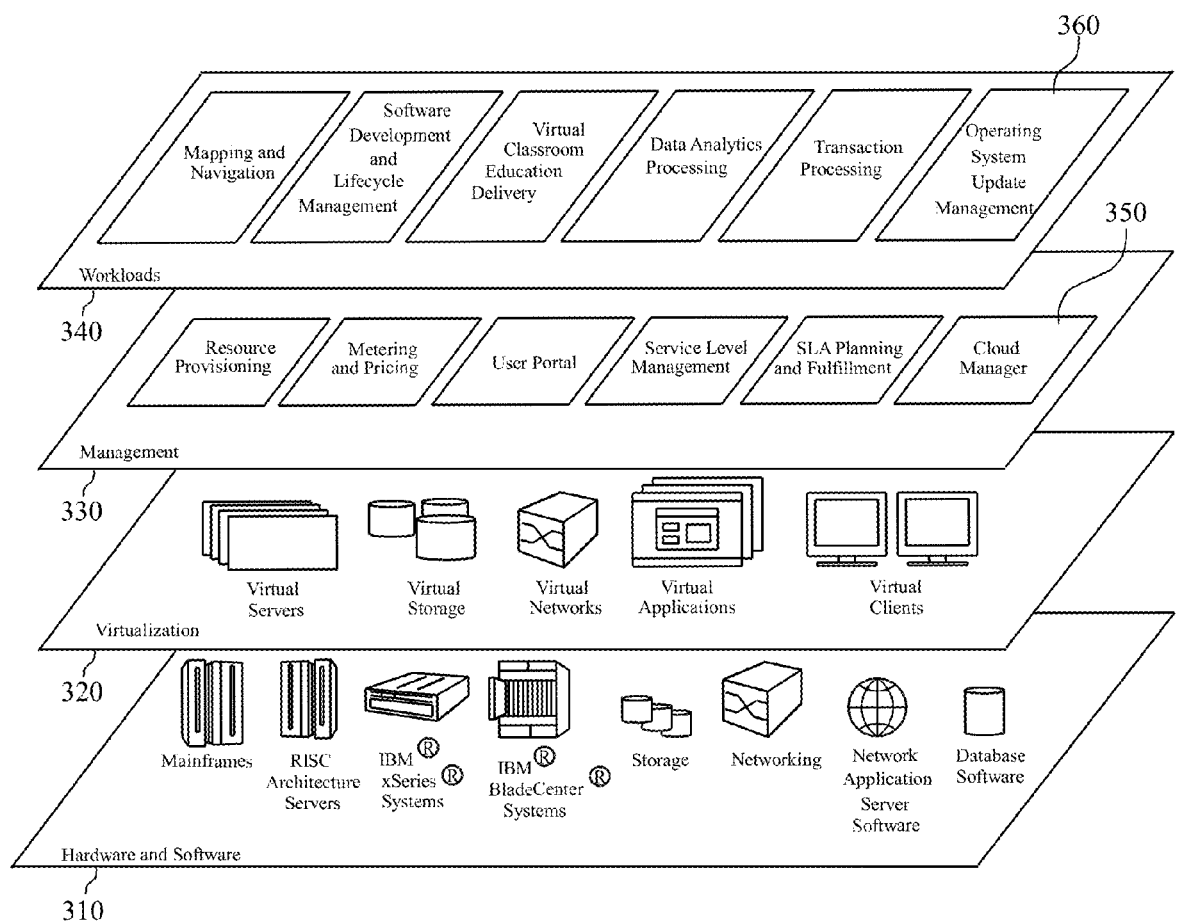
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and operating system update management 360, which may be utilized as discussed in more detail below.

Figure 4:
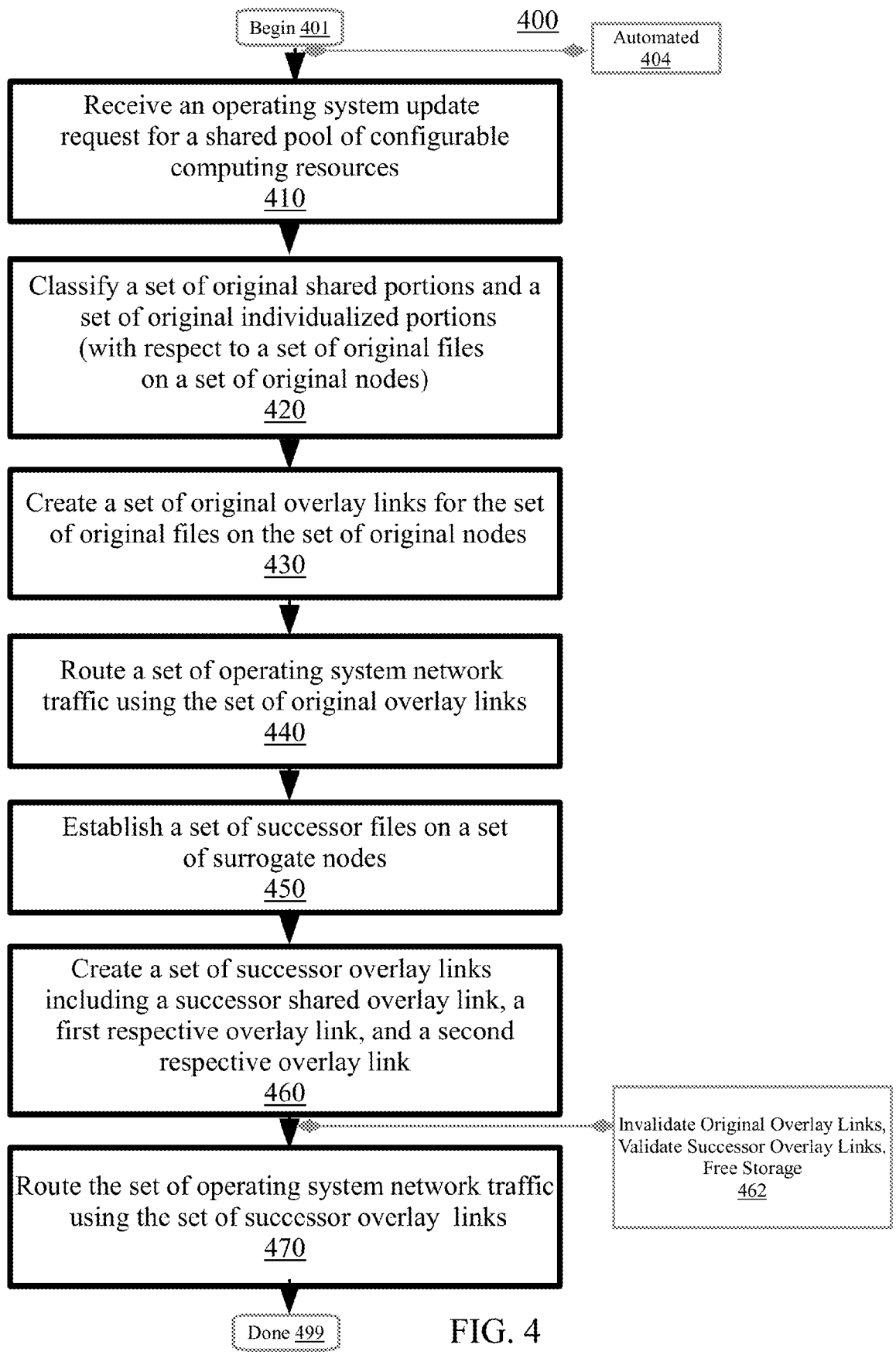
FIG. 4 is a flowchart illustrating a method of operating system update management for a shared pool of configurable computing resources having a plurality of logical partitions (LPARS), according to embodiments.

FIG. 4 is a flowchart illustrating a method 400 of operating system update management for a shared pool of configurable computing resources having a plurality of logical partitions (LPARS). Aspects of FIG. 4 relate to dynamically (e.g., in real-time, ongoing, on-the-fly) initiating performance of a live kernel update (LKU) operation to update multiple logical partitions of a set of computing resources. The live kernel update operation may be performed with respect to a set of original files on a set of original nodes. The set of original nodes can include logical partitions, virtual machines, or other emulated computer system environments based on computer architectures and configured to perform one or more tasks or functions. In embodiments, the set of original nodes can include subsets of a computer's hardware resources that are virtualized as a separate computer and configured to provide a complete system platform and operating system environment for program execution. In embodiments, the set of original nodes may include a set of original files having individualized and shared portions. Leveraging individualized (e.g., private) and shared regions for operating system update management may be associated with benefits including efficient disk space usage, streamlined data sharing/transfer, and operating system reliability. The method 400 may begin at block 401.

In embodiments, the receiving, the classifying, the creating, the routing, the establishing, the creating, the routing, and other steps described herein may each occur in an automated fashion without user intervention at block 404. In embodiments, the receiving, the classifying, the creating, the routing, the establishing, the creating, the routing, and other steps described herein may be carried out by an internal operating system update management module maintained in a persistent storage device of the shared pool of configurable computing resources (e.g., database, central management server). In certain embodiments, the receiving, the classifying, the creating, the routing, the establishing, the creating, the routing, and other steps described herein may be carried out by an external operating system update management module hosted by a remote computing device or server (e.g., accessible via a subscription, usage-based, or other service model). In this way, aspects of operating system update management may be performed using automated computing machinery without manual action. Other methods of performing the steps described herein are also possible.

At block 410, an operating system update request may be received for the shared pool of configurable computing resources. Generally, receiving can include detecting, collecting, recognizing, acquiring, sensing, or otherwise accepting delivery of the operating system update request. In embodiments, the operating system update request may include a set of computer instructions seeking permission or authorization to amend, renew, add features, or otherwise upgrade one or more aspects of the software environment of the shared pool of computing resources. The operating system update request may include an error fix, security patch, version renewal, performance/usability improvement, or other type of update with respect to a base operating system, technology level, service pack, or other aspect of the software environment of the shared pool of computing resources. As an example, receiving the operating system update request may include accepting a notification of a pending software version update to a shared base software platform of the shared pool of computing resources, as well as a set of individual service packs for a set of logical partitions (e.g., each service pack targets a different logical partition). Other methods of receiving the operating system update request are also possible.

At block 420, a set of original shared portions and a set of original individualized portions may be classified with respect to a set of original files on the set of original nodes. A respective original file of the set of original files may have a respective original shared portion and a respective original individualized portion. Generally, classifying can include categorizing, organizing, labeling, formatting, structuring, or otherwise arranging the set of original shared portions and the set of original individualized portions. Aspects of the disclosure relate to the recognition that, in certain situations, it may be desirable to maintain a common (e.g., shared) base operating system between a set of logical partitions while reserving a private (e.g., individualized) data space of each logical partition for use by service packs, technology levels, and other software specific to a certain logical partition. Accordingly, aspects of the disclosure relate to classifying a set of original shared portions and a set of original individualized portions for a set of original files. The set of original files may include a collection of related data or program records stored on an original node (e.g., logical partition). In embodiments, classifying may include formatting the set of original files (e.g., a respective original file for each original node) to create a first partition corresponding to the original shared portion and a second partition corresponding to the respective original individualized portion (e.g., such that each original node has a respective original file including an original shared portion and an original individualized portion). Other methods of classifying the set of original files are also possible.

As described herein, the set of original files may be classified to have a set of original shared portions and a set of original individualized portions. The set of original shared portions may include segments or regions of an original file that are designated for use by data or applications common between one or more original nodes. In embodiments, the set of original shared portions may include separate physical address spaces (e.g., local storage, communicatively connected storage devices, remote storage) for each respective original node that are configured to maintain data shared by the set of original nodes. For instance, the set of original shared portions may be used to store a set of original base operating system images for the set of original nodes. The set of original base operating system images may include serialized copies or reproductions of the files that constitute the core functionality of an original node (e.g., software responsible for managing hardware and software resources to facilitate system operation). In embodiments, the set of original base operating system images may be common between the set of original nodes (e.g., each original node uses the same operating system version, such as software version 7.1.x.x). In certain embodiments, each original node of the set of original nodes may maintain a copy of the base operating system image in local storage (e.g., stored on the original node itself). In embodiments, each original node of the set of original nodes may maintain the base operating system image in a separate physical memory storage unit at set of data blocks/addresses designated for shared storage. In this way, the set of original shared portions may be used to facilitate storage of data and applications common to the set of original nodes (e.g., data may be saved in the same physical memory space or different physical spaces while remaining common between the set of original nodes.)

In embodiments, the set of original files may include a set of original individualized portions. As described herein, aspects of the disclosure relate to the recognition that, in certain situations, it may be desirable to modify or customize one or more aspects of an individual logical partition without making changes to the base operating system or other common data shared by the entire set of original nodes. Accordingly, aspects of the disclosure relate to a set of original individualized portions for maintaining data or information that only applies to a particular original node. Generally, the set of individualized portions may include segments or regions of an original file that are designated for use by data or applications specifically configured for a particular original node. In embodiments, the set of original individualized portions may be used to store a set of original technology levels. The set of original technology levels may include a group of software fixes and new features added to the software environment of an original node. The set of original technology levels may be used to provide new functionality or deliver error fixes. In embodiments, the set of original individualized portions may be used to store a set of service packs. The set of service packs may include a collection of updates, fixes, or enhancements delivered in the form of a single installable package to a particular original node. As described herein, the set of original individualized portions may be used to store different technology levels and service packs for different original nodes. In this way, a common base operating system may be shared across the set of original nodes (e.g., via the set of original shared portions) while maintaining different fine-grained calibrations for each individual original node (e.g., via the set of original individualized portions). As an example, a set of original nodes may include a first original node with a software version of 7.1.0.1, a second original node with a software version of 7.1.0.4 and a third original node with a software version of 7.1.0.6 (e.g., where 7.1. represents the base operating system, and the subsequent decimal places represent minor version differences). Other methods of classifying the set of original files and using the set of original individualized portions and the set of original shared portions are also possible.

At block 430, a set of original overlay links may be created for the set of original files on the set of original nodes. The set of overlay links may include a respective original overlay link for the respective original file of the set of original files. Generally, creating can include generating, constructing, setting-up, instantiating, or producing the set of overlay links. Aspects of the disclosure relate to the recognition that, in embodiments, it may be desirable to generate a back-up image of the operating system of a set of original nodes together with logical mappings used by the set of original nodes for accessing operating system files and routing data traffic (e.g., prior to an operating system update). Accordingly, aspects of the disclosure relate to creating a set of overlay links to facilitate communication between one or more original nodes and one or more physical memory spaces (e.g., maintaining operating system files for the set of original nodes). The set of overlay links may include intermediary logical elements configured to indicate the saved location of data or information on the physical memory spaces (e.g., local storage, remote storage, connected storage devices). As examples, the set of overlay links may include pointers, indicators, addresses, or mappings that designate the location of particular data files on one or more physical memory spaces. In embodiments, creating may include mapping a particular data file on a physical memory space with an associated memory address, and registering the memory address in a network logical topology database accessible by the set of original nodes (e.g., such that one or more original nodes may use the memory address to access the data file). Other methods of creating the set of original overlay links are also possible.

At block 440, a set of operating system network traffic may be routed using the set of original overlay links. Generally, routing can include directing, conveying, transmitting, sending, or conducting the set of operating system traffic network. The set of operating system network traffic may include data packets, program commands, software instructions, and other types of communication carried out between one or more original nodes of the set of original nodes and the physical memory space. Routing may include facilitating access by the set of original nodes to data or information saved on one or more physical memory spaces. In embodiments, routing can include requesting a particular data file (e.g., an original node seeking a file from a physical memory space), and using the set of original overlay links to identify the saved location and access the particular data file. As an example, a particular original node of the set of original nodes may specify a request for a program data file corresponding to a network diagnostic tool. The particular original node may search a network logical topology database to identify an associated memory address for the desired program data file, and utilize the set of original overlay links to access and read the program data file from the corresponding memory address of the physical memory space. Other methods of routing the set of operating system network traffic using the set of original overlay links are also possible.

At block 450, a set of successor files may be established on a set of surrogate nodes to succeed the set of original files on the set of original nodes. Generally, establishing can include providing, generating, instantiating, placing, deploying, setting-up, implementing, or instituting the set of successor files on the set of surrogate nodes. Aspects of the disclosure relate to the recognition that, in some situations, generating a reproduction of the set of original files and the set of original nodes may be associated with streamlined update performance for a shared pool of computing resources (e.g., updates may be performed on the duplicated files/nodes, and LPAR system operations may be switched over upon update completion to avoid system restarts). The set of surrogate nodes may include virtualized duplicates, reproductions, copies, or substitutes of the set of original nodes. The set of surrogate nodes may maintain the same operating configuration, system parameters, and other characteristics of the set of original nodes. In embodiments, establishing the set of successor files on the set of surrogate nodes may include creating a new logical partition for each original node of the set of original nodes, and replicating the system configuration of each respective original node on a corresponding surrogate node. As described herein, the set of surrogate nodes may include a set of successor files to succeed (e.g., follow, come after, replace) the set of original files. In embodiments, the set of successor files may include reproductions or copies of the set of original files, and may be maintained on the set of surrogate nodes. In certain embodiments, the set of successor files may be configured to receive one or more operating system updates (e.g., based on the operating system update request). Other methods of establishing the set of successor files on the set of surrogate nodes are also possible.

In embodiments, aspects of the disclosure relate to the recognition that use of a single shared memory space (e.g., single physical memory device) for the set of surrogate nodes may be associated with benefits including operating system update efficiency and reduced disk storage use (e.g., as multiple nodes are configured to share the same data files). Accordingly, aspects of the disclosure relate to establishing a set of successor files configured to map to a single successor shared storage segment (e.g., that maintains data common to the set of surrogate nodes) as well as respective successor individualized storage elements (e.g., that maintain data particularly configured for certain surrogate nodes). In embodiments, one or more respective successor files of the set of successor files may map to a single successor shared storage segment. The single successor shared storage segment may include a unified memory space (e.g., database, storage device) configured to maintain data and information shared by the set of surrogate nodes. As an example, the single successor shared storage segment may include a central storage server configured to maintain a single successor base operating system image that is common for a plurality of logical partitions. The single successor base operating system image may include a copy or reproduction of an operating system that is configured to be accessed and shared by the set of surrogate nodes (e.g., multiple surrogate nodes may access the same OS files on the same physical memory space). In certain embodiments, the single successor base operating image may include an updated software version of the operating system with respect to the original base OS images of the set of original nodes (e.g., successor OS image having software version 7.2.0.0 versus original OS image having software version 7.1.0.0). Other types and uses for the single successor shared storage segment are also possible.

In embodiments, one or more successor files of the set of successor files may map to a respective successor individualized storage segment. As described herein, aspects of the disclosure relate to the recognition that in certain situations, it may be desirable to modify or customize one or more aspects of an individual logical partition (e.g., surrogate node) without making changes to the base operating system shared by the entire set of surrogate nodes (e.g., base OS image maintained on the single shared storage segment). Accordingly, aspects of the disclosure relate to a set of respective successor individualized storage segments for maintaining data or information that applies to a particular surrogate node. Generally, the set of respective successor individualized storage segments may include portions or regions of a shared memory device that are designated for use by data or applications specific to a particular surrogate node. In embodiments, the set of respective successor individualized storage segments may include a set of successor technology levels. The set of successor technology levels may include a group of software fixes and new features added to the software environment of a surrogate node. The set of successor technology levels may include updated or revised technology levels with respect to the set of original technology levels. In embodiments, the set of successor technology levels may differ for one or more respective successor individualized storage segments. As an example, a first respective successor individualized storage segment may include a first successor technology level (e.g., technology level 3.4) and a second respective successor individualized storage segment may include a second successor technology level (e.g., technology level 8.2).

In embodiments, the set of respective successor individualized storage segments may include a set of successor service packs. Generally, the set of service packs may include a collection of updates, fixes, or enhancements delivered in the form of a single installable package to a particular surrogate node. The set of successor service packs may include updated software versions with respect to the set of original service packs. As described herein, the set of respective successor individualized storage segments may be used to store different service packs for different surrogate nodes. As an example, a first respective successor individualized storage segment may include a first successor service pack (e.g., 5.1.0.6) and a second respective successor individualized storage segment may include a second successor service pack (e.g., 5.1.0.1). Other types and uses for the set of respective successor individualized storage segments are also possible.

At block 460, a set of successor overlay links may be created for the set of successor files on the set of surrogate nodes. Generally, creating can include generating, constructing, setting-up, instantiating, or producing the set of successor overlay links. Aspects of the disclosure relate to the recognition that, subsequent to establishment of the set of successor files on the set of surrogate nodes, it may be desirable to arrange (e.g., remap) a set of successor (e.g., new) overlay links to facilitate data communication between the set of surrogate nodes, single successor shared storage segment, and respective successor individualized storage segments (e.g., create new network paths to access data on a shared physical memory space). The set of successor overlay links may include pointers, indicators, addresses, mappings or other logical elements that designate the location of particular data files on a physical memory space. For instance, the set of successor overlay links may specify the network path and saved location of a data file stored in the single successor shared storage segment or a respective successor individualized storage segment. In embodiments, creating the set of successor overlay links may include generating a logical topology map of the network, and designating (e.g., highlighting, tagging, marking) a subset of network paths to connect the set of successor files on the set of surrogate nodes with a physical memory space including the single successor shared storage segment and the set of respective successor individualized storage segments. In this way, continuous file availability (e.g., of operating system images) may be maintained for a set of logical partitions throughout an operating system update. Other methods of creating the set of successor overlay links are also possible.

In embodiments, aspects of the disclosure relate to using a set of successor overlay links to facilitate data communication between a set of surrogate nodes and a single physical memory space having a single successor shared storage segment (e.g., for storage of data common to the set of surrogate nodes) and a plurality of respective successor individualized storage segments (e.g., for storage of data particularly configured for a certain surrogate node). In embodiments, the set of successor overlay links may include a successor shared overlay link which maps to the single shared storage segment. The successor shared overlay link may include a network path map or memory address configured to indicate the location of data on the single shared storage segment for access by the set of surrogate nodes. In embodiments, the successor shared overlay link may connect shared data on the single shared storage segment with each successor node of the set of successor nodes. In embodiments, the set of successor links may include a first respective overlay link which maps to the first respective successor individualized storage segment and a second respective overlay link which maps to the second respective successor individualized storage segment. As described herein, aspects of the disclosure relate to maintaining a set of respective successor individualized storage segments for maintaining data that particularly applies to or is configured for a certain surrogate node. Accordingly, a plurality (e.g., first and second) respective overlay links may be used to facilitate data transfer between respective successor individualized storage segments and corresponding surrogate nodes of the set of compute nodes. Other types of successor overlay links are also possible.

In embodiments, the set of original overlay links may be invalidated, the set of overlay links may be validated, and storage may be freed at block 462. Aspects of the disclosure relate to the recognition that, upon transitioning system operations from the set of original nodes to the set of surrogate nodes, operating system network traffic may be routed using the set of successor overlay links such that the set of original overlay links may no longer be necessary. Accordingly, in embodiments, the set of original overlay links may be invalidated. Invalidating can include deleting, abolishing, removing, nullifying, or otherwise suspending usage of the set of original overlay links. For instance, invalidating may include removing a set of network addresses associated with the set of original overlay links from a central logical topology database. As described herein, transitioning system operations to the set of surrogate nodes may include utilizing the set of successor overlay links. Accordingly, in embodiments, the set of successor overlay links may be validated. Validating can include verifying, authenticating, authorizing, or otherwise configuring the set of successor overlay links for usage. As an example, validating may include identifying data entries corresponding to the set of successor overlay links in a network logical topology database and marking them with a tag that indicates they are ready for use. Other methods of invalidating the set of original overlay links and validating the set of successor overlay links are also possible.

In embodiments, a chunk of storage corresponding to the set of original files may be freed. Generally, freeing can include clearing, releasing, deleting, or otherwise opening up a portion of storage space corresponding to the set of original files (e.g., cleaning a space). Aspects of the disclosure relate to the recognition that by making use of a single shared physical memory space for the set of surrogate nodes, multiple nodes may access and use the same data (e.g., same copy of an operating system image). Accordingly, disk storage space occupied by the set of original files (e.g., original base OS images) may be cleared for use by other data and applications. In embodiments, freeing the chunk of storage may include identifying a portion of data corresponding to the set of original files, and deleting it from memory. Consider the following example. A set of original nodes may include a first original node, a second original node, and a third original node. Each node of the set of original nodes may maintain an individual copy of an original base OS image on local storage (e.g., for a 20 gigabyte operating system, a total of 60 gigabytes may be used for operating system storage between the three original nodes). As described herein, the a set of successor files on a set of surrogate nodes may be established, and the set of surrogate nodes may share a single successor base OS image maintained on a single successor shared storage segment. Accordingly, in embodiments, the original base OS images maintained in local storage by the set of original nodes may be deleted to clear up storage space for use by other data and applications (e.g., such that a total of 20 gigabytes is used for operating system storage between the three surrogate nodes). Other methods of freeing a chunk of storage are also possible.

At block 470, the set of operating system network traffic may be routed using the set of successor overlay links in place of the set of original overlay links. Generally, routing can include directing, conveying, transmitting, sending, or conducting the set of operating system traffic network. The set of operating system network traffic may include data packets, program commands, software instructions, and other types of communication carried out between one or more logical partitions and a physical memory space. As described herein, aspects of the disclosure relate to transitioning system operations of a set of logical partitions to a set of surrogate nodes that are configured to use a set of successor overlay links for data communication with a physical memory space. Accordingly, upon transition to the set of surrogate nodes, the set of original overlay links may be replaced with the set of successor overlay links, such that data communication performed between the physical memory space and the set of surrogate nodes is carried out using the set of successor overlay links. In embodiments, routing may include facilitating access by the set of surrogate nodes to data or information saved on a shared physical memory space. As an example, a first surrogate node of the set of surrogate nodes may specify an access request for a base operating system file (e.g., stored on the single successor shared storage segment) as well as a service pack file (e.g., stored on a first respective successor individualized storage segment). Accordingly, the first surrogate node may utilize the successor shared overlay link to access the base operating system file on the single successor shared storage segment and the first respective successor overlay link to access the service pack file on the first respective successor individualized storage segment. Other methods of routing the set of operating system network traffic using the set of successor overlay links are also possible.

Consider the following example. A cloud computing environment may include a set of original nodes having a first original node, a second original node, and a third original node. Each original node may have an original shared portion (e.g., local storage, connected storage device) maintaining an individual copy of an original base operating system. The original base operating system may be a software version 7.1.x.x, and be common between the set of original nodes. In embodiments, each original node may maintain service packs and technology levels in a set of original individualized portions. As described herein, the cloud computing environment may receive an operating system update request for the set of original nodes. In embodiments, a set of original overlay links may be created to record the logical mappings between the set of original nodes, the set of original shared portions, and the set of original individualized portions. The set of original overlay links may be used to route operating system traffic between the set of original nodes, the set of original shared portions, and the set of original individualized portions.

As described herein, aspects of the disclosure relate to performing the operating system update with respect to a set of surrogate nodes, and transitioning system operations from the original set of nodes to the set of surrogate nodes. In embodiments, the set of surrogate nodes may be established by creating virtual duplicates of the set of or original nodes. For instance, a first surrogate node may be created as a copy of the first original node, a second surrogate node may be created as a copy of the second original node, and a third surrogate node may be created as a copy of the third original node. As described herein, the set of surrogate nodes may include a set of successor files. Each successor file may map to a single successor shared storage segment and one or more respective successor individualized storage segments unique to particular successor nodes. In embodiments, the single successor shared storage segment may be stored on a physical memory device that is universally accessible to the set of surrogate nodes. In embodiments, a successor base OS image (e.g., updated version of the base operating system) may be installed to the single successor shared storage segment. For instance, the successor base OS image may include an operating system software version of 7.2.xx. The successor base OS image may be shared by each node of the set of successor nodes (e.g., a single copy of the successor base OS image is common between the set of successor nodes).

In embodiments, as described herein, each successor file of the set of successor files may map to one or more respective individualized storage segments. In embodiments, the set of respective individualized storage segments may be configured to maintain technology levels, service packs, or other software features that are particular to a certain surrogate node. For instance, a first successor file of the first surrogate node may map to a first respective individualized storage segment that maintains a first service pack, a second successor file of the second surrogate node may map to a second respective individualized storage segment that maintains a second service pack, and a third successor file of the third surrogate node may map to a third respective individualized storage segment that maintains a third technology level. In embodiments, a set of successor overlay links may be created to record the logical mappings between the set of surrogate nodes, the single successor shared storage segment, and the set of respective successor individualized storage segments. The set of successor overlay links may be used to route operating system traffic between the set of surrogate nodes, the single successor shared storage segment, and the set of respective successor individualized storage segments. Accordingly, system operations for the logical partitions may be transitioned to the set of surrogate nodes and continue using the updated base OS image.

Method 400 concludes at block 499. As described herein, aspects of method 400 relate to dynamically (e.g., in real-time, ongoing, on-the-fly) initiating performance of a live kernel update (LKU) operation to update multiple logical partitions of a set of computing resources. Aspects of method 400 may provide performance or efficiency benefits for operating system update management. For example, use of a single successor shared storage segment may reduce the amount of memory space required for operating system storage (e.g., multiple logical partitions share the same base OS image). As another example, transition of system operations from a set of original nodes to a set of surrogate nodes having a successor base OS image (e.g., updated operating system version) may be associated with streamlined update installation for a set of logical partitions (e.g., the need for system restarts may be avoided.) Altogether, leveraging individualized (e.g., private) and shared regions for operating system update management may be associated with benefits including efficient disk space usage, streamlined data sharing/transfer, and operating system reliability.

Figure 5:
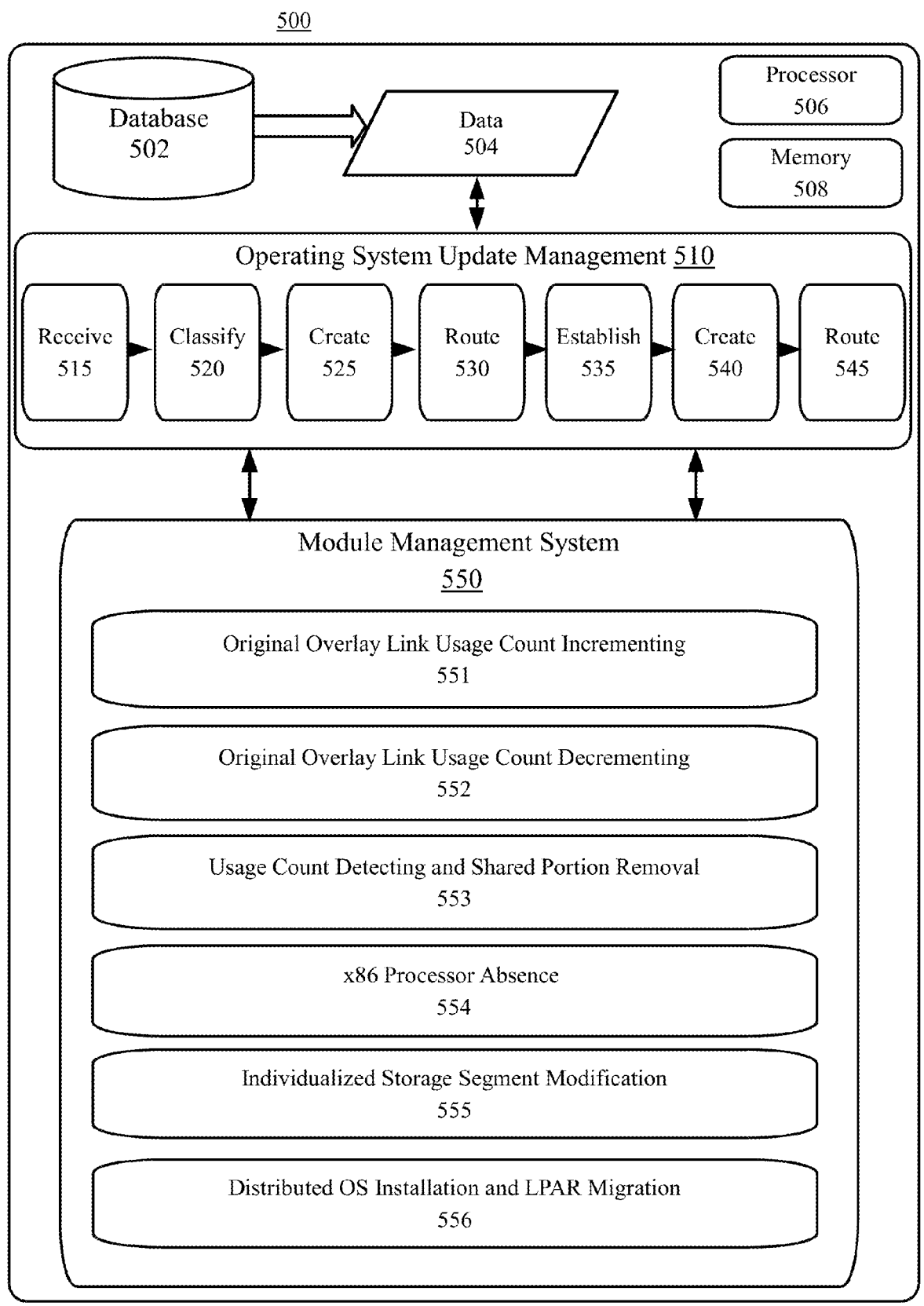
FIG. 5 shows an example system for operating system update management for a shared pool of configurable computing resources having a plurality of logical partitions, according to embodiments.

FIG. 5 shows an example system 500 for operating system update management for a shared pool of configurable computing resources having a plurality of logical partitions, according to embodiments. Aspects of FIG. 5 relate to initiating performance of a live kernel update (LKU) operation to update multiple logical partitions of a set of computing resources. The example system 500 may include a processor 506 and a memory 508 to facilitate implementation of operation system update management. The example system 500 may include a database 502 (e.g., operating system management database) configured to provide notifications and alerts of pending operating system updates to logical partitions. In embodiments, the example system 500 may include an operating system (OS) update management system 510. The OS update management system may be communicatively connected to the database 502, and be configured to receive data 504 (e.g., operating system update request) related to operating system updates. The OS update management system may include a receiving module 515 configured to receive an operating system update request, a classifying module 520 configured to classify a set of original shared portions and a set of original individualized portions with respect to a set of original files on a set of original nodes, a first creating module 525 configured to create a set of original overlay links for the set of original files on the set of original nodes, a first routing module 530 configured to route a set of operating system network traffic using the set of original overlay links, an establishing module 535 configured to establish a set of successor files on a set of surrogate nodes, a second creating module 540 to create a set of successor overlay links for the set of successor files, and a second routing block 545 to route the set of operating system network traffic using the set of successor overlay links. The operational steps described herein may be performed dynamically (e.g., in real-time, ongoing, on-the-fly) to streamline operating system update management. The OS update management system 510 may be communicatively connected with a module management system 550 that includes one or more modules for implementing aspects of operating system update management.

In embodiments, an original overlay link usage count may be incremented at module 551. The overlay link usage count may be incremented for each original overlay link of the set of original overlay links. Generally, incrementing can include raising, advancing, or increasing the overlay link usage count. Aspects of the disclosure, in certain embodiments, relate to maintaining an isolated link reference count to record the number of overlay links in use by a set of logical partitions. In embodiments, incrementing the overlay link usage count may include adding one to the overlay link usage count for each original overlay link that is created. As an example, consider a set of logical partitions that has a total of 12 original overlay links. Accordingly, the link usage count (e.g., isolated link reference count) may indicate a value of "12" to reflect that there are 12 original overlay links in use. In response to creation of a new original overlay link, the link usage count may be incremented from "12" to "13" to record the increase to the number of original overlay links. Other methods of incrementing the original overlay link usage count are also possible.

In embodiments, the original overlay link usage count may be decremented at module 552. The overlay link usage count may be decremented for each original overlay link of the set of original overlay links that is switched to the set of successor overlay links. Generally, decrementing can include decreasing, lessening, lowering, or otherwise reducing the overlay link usage count. Aspects of the disclosure, in certain embodiments, relate to the recognition that as system operations for a set of logical partitions transition to a set of surrogate nodes, the set of original overlay links may be replaced with a set of successor overlay links. Accordingly, aspects of the disclosure relate to updating the original overlay link usage count to reflect the number of original overlay links that remain active. In embodiments, decrementing the overlay link usage count may include removing one from the overlay link usage count for each original overlay link that is switched to a successor overlay link. As an example, consider a set of logical partitions that has a total of 21 original overlay links. Accordingly, the link usage count may indicate a value of "21" to reflect that there are 21 original overlay links in use. In response to switching an original overlay link to a successor overlay link (e.g., invalidating the original overlay link and validating the corresponding successor overlay link), the link usage count may be reduced from "21" to "20" to record the decrease to the number of original overlay links. Other methods of incrementing the original overlay link usage count are also possible.

In embodiments, the original overlay link usage count may be reduced and an original shared portion of the set of original files may be removed at module 553. In embodiments, in response to a live kernel update (LKU) operation, it may be detected that the original overlay link usage count has shrunk to zero. Generally, detecting can include sensing, recognizing, identifying, discovering, or otherwise ascertaining that the original overlay link usage count has shrunk to zero. In embodiments, detecting may include consulting a network logical topology database and ascertaining that all of the original overlay links have been transitioned to successor overlay links, and that the link usage count has been reduced to zero. In response to detecting that the original overlay link usage count has shrunk to zero, the respective original shared portion of the respective original file of the set of original files may be removed. Removing may include deleting, eliminating, clearing, or otherwise erasing the respective original shared portion of the set of original files. Aspects of the disclosure relate to the recognition that, once all of the original overlay links have been switched to successor overlay links, system operations for the set of original nodes may have transitioned to the set of surrogate nodes and the respective original shared portion may no longer be needed (e.g., the surrogate nodes make use of the single successor shared storage segment for common data). Accordingly, the respective original shared portion may be deleted, and storage space may be freed for use by other data or applications. Other methods of detecting that the original overlay link usage count has shrunk to zero and removing the respective original shared portion are also possible.

In embodiments, an x86 processor may be absent with respect to the shared pool of configurable computing resources at module 554. x86 processors may utilize software hypervisors for virtualization. x86 processors can have additional layers with respect to non-x86 processors. In certain embodiments, support for a hypervisor is built into the chip (e.g., embedded firmware managing the processor and memory resources). Accordingly, the hypervisor may run as a piece of firmware code interacting with the hardware and virtual machines. In embodiments, the shared pool of configurable computing resources may make use of an advanced interactive executive (AIX) or Linux based system architecture. Other types of system architectures are also possible.

In embodiments, the first respective successor individualized storage segment may be modified without modifying the second respective successor individualized storage segment or the single successor shared storage segment at module 555. Generally, modifying can include adjusting, editing, altering, revising, reading data, writing data, or otherwise changing the first respective successor individualized storage segment. As described herein, aspects of the disclosure relate to a set of respective successor individualized storage segments for storing data that applies or is particularly configured for a certain surrogate node. For instance, in embodiments, it may be desirable to make changes or adjustments to a particular surrogate node without affecting other surrogate nodes of the set of surrogate nodes. Accordingly, aspects of the disclosure relate to modifying a first respective successor individualized storage segment without modifying the second respective successor individualized storage segment or the single successor shared storage segment. In embodiments, modifying may include using the first respective overlay link to read or write data from the first respective successor individualized storage segment. As an example, modifying may include installing a new service pack or technology level to a particular surrogate node without changing the base OS image (e.g., stored in the successor shared storage segment) or technology levels/service packs (e.g., stored in other respective successor individualized storage segments) of other surrogate nodes. Other methods of modifying the first respective successor individualized storage segment are also possible.

In embodiments, a distributed operating system update installation may be carried-out and a plurality of logical partitions may be migrated at module 556. Generally, carrying-out can include completing, implementing, achieving, executing, or otherwise performing the distributed operating system update installation. In embodiments, carrying-out may include performing the operating system update installation on a set of cloud computing nodes located in different geographic locations (e.g., dynamically, simultaneously). In embodiments, carrying-out may include installing/deploying the operating system update on a physical memory space shared by a set of surrogate nodes (e.g., such that each surrogate node shares the same copy of the updated operating system image). In embodiments, a plurality of logical partitions may be migrated within a threshold temporal period and using less than a threshold amount of storage. Generally, migrating can include transferring, deploying, allocating, transmitting, sending, or otherwise moving a logical partition from one physical or virtual location to another. For instance, migrating can include relocating one or more logical partitions from a first physical computing node to a second physical computing node. In embodiments, migrating may include transitioning system operations from a set of original nodes to a set of surrogate nodes. In embodiments, the plurality of logical partitions may be migrated within a threshold temporal period (e.g., less than a defined time period; less than 30 minutes, less than an hour) and using less than a threshold amount of storage (e.g., no more than a 10% increase to current storage usage; at least a 15% decrease in total storage usage compared to the current configuration). Other methods of carrying-out the distributed operating system installation and migrating the plurality of logical portions are also possible.

Figure 6:
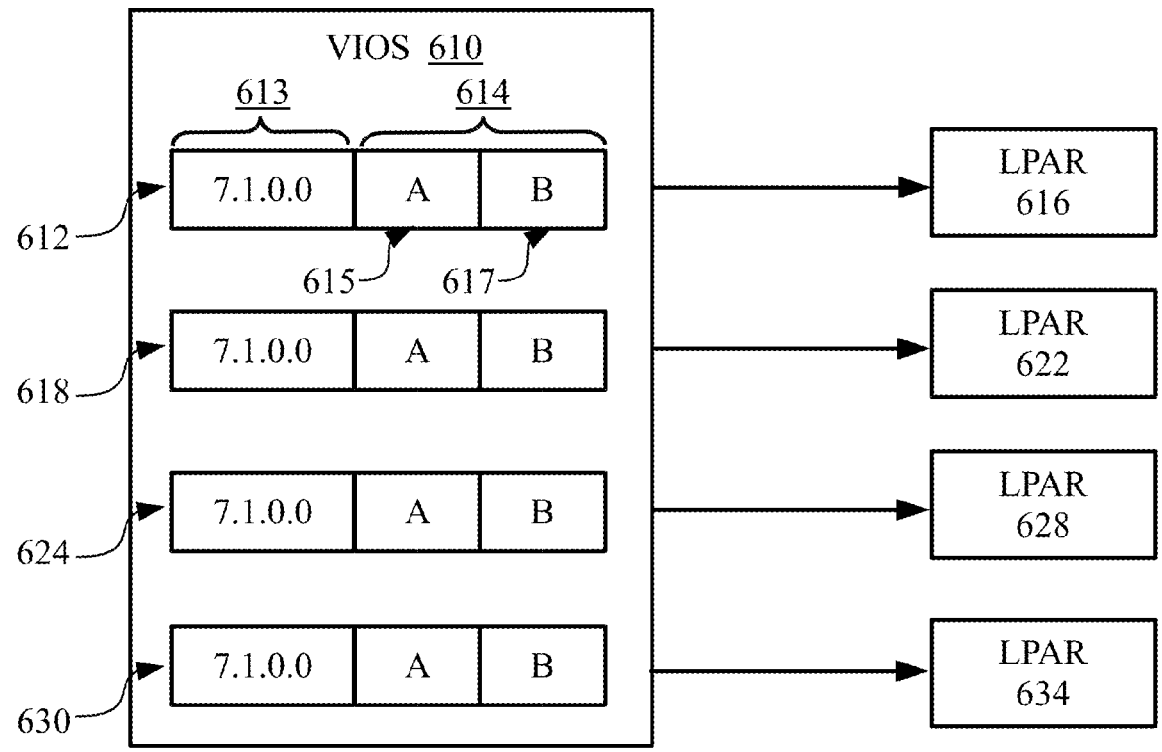
FIG. 6 illustrates an example LPAR configuration for operating system update management, according to embodiments.

FIG. 6 illustrates an example LPAR configuration 600 for operating system update management, according to embodiments. Aspects of FIG. 6 relate to a virtual input/output server (VIOS) 610 that is communicatively connected to a set of LPARs. In embodiments, the VIOS 610 may include a set of files having a first file 612, a second file 618, a third file 624, and a fourth file 630. Each file of the set of files may correspond to a different LPAR of the set of LPARs. For instance, as shown in FIG. 6, the first file 612 may correspond to a LPAR 616, the second file 618 may corresponding to a LPAR 622, the third file 624 may correspond to a LPAR 628, and the fourth file 630 may correspond to a LPAR 634. As described herein, each file of the set of files may include a shared portion. As an example, the first file 612 may include a shared portion 613. The shared portion may maintain a base operating system image that is common between the set of LPARs. As shown in FIG. 6, the set of LPARs may share a base operating system version of 7.1.0.0. In embodiments, the shared portion of each file may map to a single shared storage segment, such that each LPAR of the set of LPARs access a single base OS image. Accordingly, in embodiments, changes (e.g., updates) made to the single base OS image stored in the single shared storage segment may be affect (e.g., be reflected) each LPAR of the set of LPARs.

In embodiments, as described herein, each file of the set of files may include an individualized portion. As an example, the first file 612 may include an individualized portion 614. The individualized portion may maintain technology levels, service packs, or other files or data that apply or are particularly configured for a certain LPAR. In embodiments, the individualized portion may include a first section and a second section. For instance, the individualized portion 614 may include a first section 615 and a second section 617. In embodiments, the first section 615 may maintain technology levels or service packs that are specific to a certain LPAR. In embodiments, the second section 617 may store specific properties of a particular LPAR (e.g., characteristics that may remain unaffected by OS updates or other data/application installations). For instance, information such as IP addresses, physical memory addresses, and other such information may be maintained in the second section 617. In embodiments, changes or modifications made to data on the individualized portion of a file may remain specific to that file. Other methods of structuring LPAR configurations for operating system upgrade management are also possible.

Figure 7:
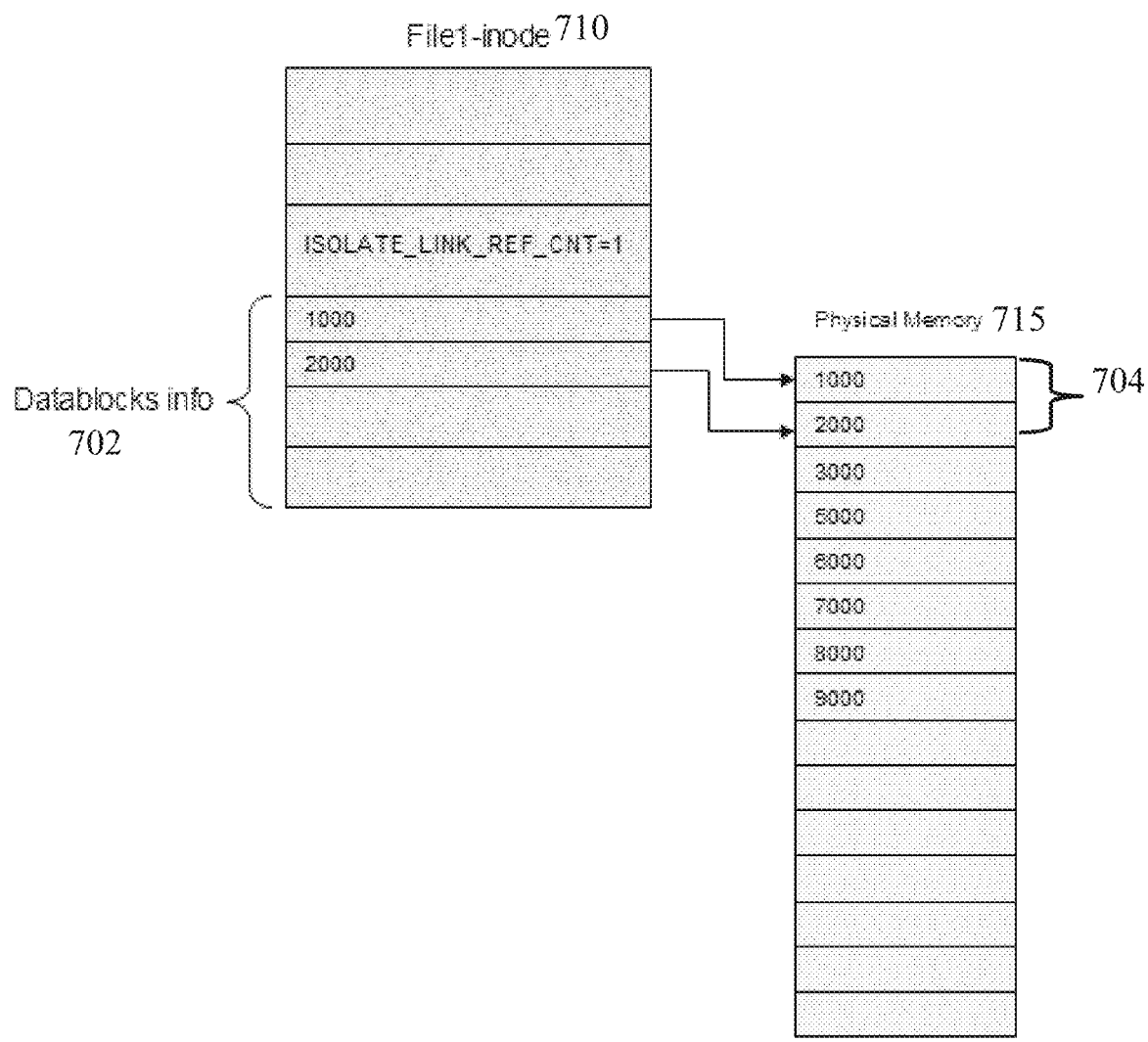
FIG. 7 illustrates an example node and physical memory space configuration for operating system update management, according to embodiments.

FIG. 7 illustrates an example node and physical memory space configuration 700 for operating system update management, according to embodiments. Aspects of FIG. 7 relate to using a set of original overlay links 702 to facilitate data communication between a first node file 710 and a physical memory space 715. As described herein, aspects of the disclosure relate to using a set of original overlay links to indicate the saved location of data or information on the physical memory space 715. For instance, the physical memory space 715 may maintain a set of data files (e.g., base operating system images) that may be accessed by logical partitions (e.g., first node file 710) to facilitate system operations. As an example, the physical memory space 715 may include a set of data stored at a first memory address location 704 (e.g., memory blocks 1000 and 2000). As described herein, aspects of the disclosure relate to creating a set of overlay links 702 to map a portion of the first node file 710 to the memory address location 704. Accordingly, in embodiments, creating the set of overlay links 702 may include registering the memory address location (e.g., memory blocks 1000 and 2000) of a particular data file to the first node file 710 such that the first node file 710 may access data saved at the memory address location 704. Other methods of facilitating data communication between nodes and physical memory spaces are also possible.

Figure 8:
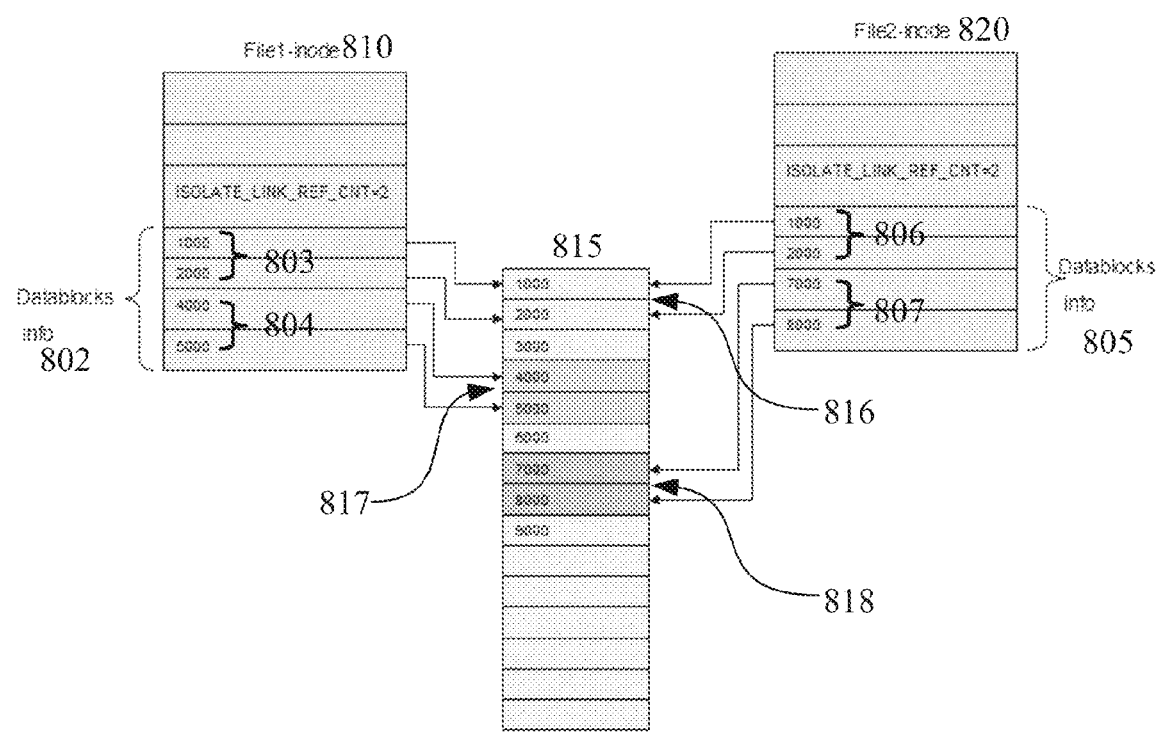
FIG. 8 illustrates an example node and physical memory space configuration for operating system update management, according to embodiments.

FIG. 8 illustrates an example node and physical memory space configuration 800 for operating system update management, according to embodiments. Aspects of FIG. 8 relate to using a set of successor overlay links to facilitate data communication between a first node file 810, a second node file 820, and a physical memory space 815. As described herein, aspects of the disclosure relate to establishing a set of successor files on a set of surrogate nodes, where each successor file maps to single successor shared storage segment as well as one or more respective successor individualized storage segments. In embodiments, the first node file 810 may include a first successor file on a first surrogate node, and the second node file 820 may include a second successor file on a second surrogate node. In embodiments, the physical memory space 815 may include a single successor shared storage segment 816, a first respective successor individualized storage segment 817, and a second respective successor individualized storage segment 818. As described herein, the single successor shared storage segment 816 may be used for store data or information that is common to multiple surrogate nodes. For instance, in embodiments, the single successor shared storage segment 816 may maintain a single copy of a successor base operating system image that may be used by at least the first surrogate node and the second surrogate node. In embodiments, the first respective successor individualized storage segment 817 and the second respective successor individualized storage segment 818 may maintain data or information that is specific to a particular surrogate node. For instance, the first respective successor individualized storage segment 817 may maintain a service pack specific to the first node file 810, and the second respective successor individualized storage segment 818 may include a technology level that is specific to the second node file 820.

As described herein, a set of successor overlay links may be used to facilitate data communication between the physical memory space 815, the first node file 810, and the second file node 820. In embodiments, a first subset of successor overlay links 802 may be used to indicate the saved location of data or information on the physical memory space 815 to the first node file 810. For instance, the first subset of successor overlay links 802 may include a first successor overlay link 803 that maps to the single successor shared storage segment 816, and a second successor overlay link 804 that maps to the first respective successor individualized storage segment 817. In embodiments, the memory address (e.g., memory blocks 1000 and 2000) of a shared data file (e.g., successor base OS image) as well as the memory address (e.g., memory blocks 4000 and 5000) of a data file specific to the node file 810 (e.g., service pack) may be registered to the first node file 810. In embodiments, a second subset of successor overlay links 805 may be used to indicate the saved location of data or information on the physical memory space 815 to the second node file 820. For instance, the second subset of successor overlay links 805 may include a third successor overlay link 806 that maps to the single successor shared storage segment 816, and a fourth successor overlay link 807 that maps to the second respective successor individualized storage segment 818. In embodiments, the memory address (e.g., memory blocks 1000 and 2000) of a shared data file (e.g., successor base OS image) as well as the memory address (e.g., memory blocks 7000 and 8000) of a data file specific to the node file 820 (e.g., technology level) may be registered to the second file node 820. In this way, both the first node file 810 and the second node file 820 may access and share common data files (e.g., operating system images) from the single successor shared storage segment 816 while maintaining individualized storage space (e.g., for service packs and technology levels specific to certain surrogate nodes). Other methods of facilitating data communication between nodes and physical memory spaces are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method of operating system update management for a shared pool of configurable computing resources having a plurality of logical partitions (LPARs), the method comprising:
    receiving an operating system update request for the shared pool of configurable computing resources;
    classifying, with respect to a set of original files on a set of original nodes, a set of original shared portions and a set of original individualized portions, wherein a respective original file of the set of original files has a respective original shared portion and a respective original individualized portion;
    creating, for the set of original files on the set of original nodes, a set of original overlay links including a respective original overlay link for the respective original file of the set of original files;
    routing a set of operating system network traffic using the set of original overlay links;
    establishing, to succeed the set of original files on the set of original nodes, a set of successor files on a set of surrogate nodes, wherein a first respective successor file of the set of successor files maps to a single successor shared storage segment and a first respective successor individualized storage segment, and wherein a second respective successor file of the set of successor files maps to the single successor shared storage segment and a second respective successor individualized storage segment;
    creating, for the set of successor files on the set of surrogate nodes, a set of successor overlay links including: a successor shared overlay link which maps to the single successor shared storage segment, a first respective overlay link which maps to the first respective successor individualized storage segment, and a second respective overlay link which maps to the second respective successor individualized storage segment; and
    routing, in place of the set of original overlay links, the set of operating system network traffic using the set of successor overlay links.

2. The method of claim 1, further comprising:
    initiating, with respect to the set of original files on the set of original nodes which have the set of original overlay links, performance of a live kernel update (LKU) operation.

3. The method of claim 2, wherein performance of the LKU operation includes:
    invalidating the set of original overlay links;
    validating the set of successor overlay links; and freeing a chunk of storage corresponding to the set of original files.

4. The method of claim 1, wherein the set of original shared portions includes a set of original base operating system images.

5. The method of claim 4, wherein the set of original individualized portions is selected from the group consisting of:
- a set of original technology levels, and
- a set of original service packs.

6. The method of claim 1, wherein the single successor shared storage segment includes a single successor base operating system image which is common for the plurality of LPARs.

7. The method of claim 6, wherein the first respective successor individualized storage segment includes a first successor technology level, and wherein the second respective successor individualized storage segment includes a second successor technology level which differs from the first successor technology level.

8. The method of claim 6, wherein the first respective successor individualized storage segment includes a first successor service pack, and wherein the second respective successor individualized storage segment includes a second successor service pack which differs from the first successor service pack.

9. The method of claim 1, further comprising:
carrying-out, while maintaining ongoing operating system availability, an operating system update of the plurality of LPARs in both an automated fashion and a dynamic fashion.

10. The method of claim 1, further comprising:
incrementing, for each original overlay link of the set of original overlay links, an original overlay link usage count.

11. The method of claim 10, further comprising:
decrementing, for each original overlay link of the set of original overlay links switched to the set of successor overlay links, the original overlay link usage count.

12. The method of claim 11, further comprising:
detecting, in response to an LKU operation, that the original overlay link usage count has shrunk to zero; and
removing, in response to detecting that the original overlay link usage count has shrunk to zero, the respective original shared portion of the respective original file of the set of original files.

13. The method of claim 1, wherein an x86 processor is absent with respect to the shared pool of configurable computing resources.

14. The method of claim 1, further comprising:
modifying, without modifying the second respective successor individualized storage segment and without modifying the single successor shared storage segment, the first respective successor individualized storage segment.

15. The method of claim 1, further comprising:
carrying-out a distributed operating system update installation; and
migrating the plurality of LPARs within a threshold temporal period using less than a threshold amount of storage.

16. The method of claim 1, wherein the set of operational steps each occur in a dynamic fashion to streamline operating system update management.

17. The method of claim 1, wherein the set of operational steps each occur in an automated fashion without user intervention.

18. A system of operating system update management for a shared pool of configurable computing resources having a plurality of logical partitions (LPARs), the system comprising:
a memory having a set of computer readable computer instructions, and
a processor for executing the set of computer readable instructions, the set of computer readable instructions including:
receiving an operating system update request for the shared pool of configurable computing resources;
classifying, with respect to a set of original files on a set of original nodes, a set of original shared portions and a set of original individualized portions, wherein a respective original file of the set of original files has a respective original shared portion and a respective original individualized portion;
creating, for the set of original files on the set of original nodes, a set of original overlay links including a respective original overlay link for the respective original file of the set of original files;
routing a set of operating system network traffic using the set of original overlay links;
establishing, to succeed the set of original files on the set of original nodes, a set of successor files on a set of surrogate nodes, wherein a first respective successor file of the set of successor files maps to a single successor shared storage segment and a first respective successor individualized storage segment, and wherein a second respective successor file of the set of successor files maps to the single successor shared storage segment and a second respective successor individualized storage segment;
creating, for the set of successor files on the set of surrogate nodes, a set of successor overlay links including: a successor shared overlay link which maps to the single successor shared storage segment, a first respective overlay link which maps to the first respective successor individualized storage segment, and a second respective overlay link which maps to the second respective successor individualized storage segment; and
routing, in place of the set of original overlay links, the set of operating system network traffic using the set of successor overlay links.

19. A computer program product of operating system update management for a shared pool of configurable computing resources having a plurality of logical partitions (LPARs), the computer program product comprising a computer readable storage medium having program instructions embodied therewith, wherein the computer readable storage medium is not a transitory signal per se, the program instructions executable by a processor to cause the processor to perform a method comprising:
receiving an operating system update request for the shared pool of configurable computing resources;
classifying, with respect to a set of original files on a set of original nodes, a set of original shared portions and a set of original individualized portions, wherein a respective original file of the set of original files has a respective original shared portion and a respective original individualized portion;
creating, for the set of original files on the set of original nodes, a set of original overlay links including a respective original overlay link for the respective original file of the set of original files;

routing a set of operating system network traffic using the set of original overlay links;

establishing, to succeed the set of original files on the set of original nodes, a set of successor files on a set of surrogate nodes, wherein a first respective successor file of the set of successor files maps to a single successor shared storage segment and a first respective successor individualized storage segment, and wherein a second respective successor file of the set of successor files maps to the single successor shared storage segment and a second respective successor individualized storage segment;

creating, for the set of successor files on the set of surrogate nodes, a set of successor overlay links including: a successor shared overlay link which maps to the single successor shared storage segment, a first respective overlay link which maps to the first respective successor individualized storage segment, and a second respective overlay link which maps to the second respective successor individualized storage segment; and routing, in place of the set of original overlay links, the set of operating system network traffic using the set of successor overlay links.

20. The computer program product of claim 19, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *